United States Patent [19]

Hall, Jr. et al.

[11] 4,070,145
[45] Jan. 24, 1978

[54] SELECTIVE ACTUATING MECHANISM FOR SIGNAL DEVICE USING PERCUSSIVE FLASHLAMPS

[75] Inventors: Harold H. Hall, Jr., Marblehead; Andre C. Bouchard, Peabody, both of Mass.

[73] Assignee: GTE Sylvania Incorporated, Stamford, Conn.

[21] Appl. No.: 695,991

[22] Filed: June 14, 1976

[51] Int. Cl.² .................................. F21K 5/02
[52] U.S. Cl. ............................ 431/93; 362/13
[58] Field of Search ............... 431/92, 93; 240/1.3

[56] References Cited

U.S. PATENT DOCUMENTS

| 3,735,111 | 5/1973 | Shaffer | 431/93 |
| 3,753,390 | 8/1973 | Hough et al. | 431/92 |
| 3,980,421 | 9/1976 | Heeman et al. | 431/93 |

Primary Examiner—Carroll B. Dority, Jr.
Assistant Examiner—R. J. Charvat
Attorney, Agent, or Firm—Edward J. Coleman

[57] ABSTRACT

For a signal device comprising a plurality of percussively ignitable flashlamps mounted on a support member and arranged in an array with respectively associated preenergized striker springs, a selective actuating mechanism for sequentially releasing the striker springs to fire respective flashlamps in response to successive hand actuated indexing. The selective actuating mechanism comprises a spring-loaded ratchet bar retained in a longitudinal channel in the support member in combination with a slidable member which is also retained in the channel in engageable contact with the ratchet bar. The lamps and striker springs are mounted in a row parallel to the channel with the strikers projecting beyond the periphery of the channel. The slidable member, which may comprise a folded flat spring having a first tang for engaging the ratchet bar and a second tang for engaging a surface of the channel, has a trip wire projection which is aligned with the projecting portions of the strikers. Upon successive hand actuation of the ratchet bar, the slidable member is indexed along the channel so that the trip wire projecting therefrom sequentially releases the preenergized strikers to fire respective flashlamps.

15 Claims, 9 Drawing Figures

SELECTIVE ACTUATING MECHANISM FOR SIGNAL DEVICE USING PERCUSSIVE FLASHLAMPS

BACKGROUND OF THE INVENTION

This invention relates to signaling devices and, more particularly, to a signaling device comprising an array of percussively-ignitable flashlamps with a mechanism for permitting selective firing of the flashlamps in response to successive hand actuation.

A copending application Ser. No. 696,107 (D-8402-L), filed June 14, 1976 concurrently herewith and assigned to the present assignee, describes an improved signal device of the type which generates intense flashes of light and provides the advantages of being compact, light weight, safe, relatively inexpensive, and not requiring batteries or an electric cord connection for operation. More specifically, a hand held signal device is described comprising a plurality of percussively ignitable flashlamps mounted on a support member along with a plurality of preenergized strikers, each releasable to fire a respective flashlamps. In order to selectively fire the eight lamps in sequence, a slide member having a projecting trip wire is retained in a channel parallel to the row of flashlamps and in alignment with the striker springs, which in the cocked condition project beyond the periphery of the channel. To operate the device, a user grasps the periphery of the unit enclosure with one or two hands, faces the lamps in the direction of the intended viewer, and with his thumb slides the movable member along the channel to trip the strikers.

Although providing a relatively simple and inexpensive signal device, the unit described in the aforementioned copending application generally requires two hands for holding the device and firing the lamps, and is somewhat awkward for single-handed operation. In certain emergency situations, such as a person handling a boat in distress or floating in the water by the aid of a life vest and clutching an overturned boat, it is particularly advantageous to have a signal device which may be very conveniently operated with one hand.

SUMMARY OF THE INVENTION

Accordingly, it is an object of the present invention to provide an improved selective actuating mechanism for a signal device containing an array of percussive flashlamps and which is inexpensive, yet affords the user a simple means of firing the device single-handed.

A further object of the invention is to provide an improved signal device of the type which generates intense flashes of light but which is relatively inexpensive and convenient to use, in addition to being compact, light weight, and not requiring batteries or an electric cord connection for operation.

These and other objects, advantages and features are attained, in accordance with the invention, by a hand held signal device comprising a plurality of percussively ignitable flashlamps mounted in a row on a support member along with a plurality of preenergized strikers, each releasable to fire a respective flashlamp. In accordance with the invention, the device includes a selective actuating mechanism comprising a spring-loaded ratchet bar retained in a longitudinal channel in the support member and which is located parallel to the row of flashlamps. A slidable member is also retained in the channel in engageable contact with the ratchet bar. Means is provided on the slidable member for sequentially releasing the preenergized strikers to fire respective ones of the flashlamps in response to successive hand actuation of the ratchet bar and the resulting indexing of the slidable member engaged therewith along the channel.

In a preferred embodiment, light-shield partitions are disposed between respective pairs of the flashlamps to prevent sympathetic ignition, and a cover having at least one transparent side is fixed to the support member so as to enclose the assembly. The slidable member comprises a folded flat spring having a first tang for engaging one of the teeth on the ratchet bar and a second tang for engaging a surface of the support member channel to thereby prevent the slidable member from reversing direction following indexing thereof. The release means comprises a sloping trip wire projecting from the slidable member and disposed so that its path of travel is aligned with projecting portions of the strikers. A push button is attached to one end of the ratchet bar and is externally accessible for indexing by hand to operate the signal device.

BRIEF DESCRIPTION OF THE DRAWINGS

This invention will be more fully described in conjunction with the accompanying drawings, in which.

DESCRIPTION OF THE PREFERRED EMBODIMENT

Figure 1:
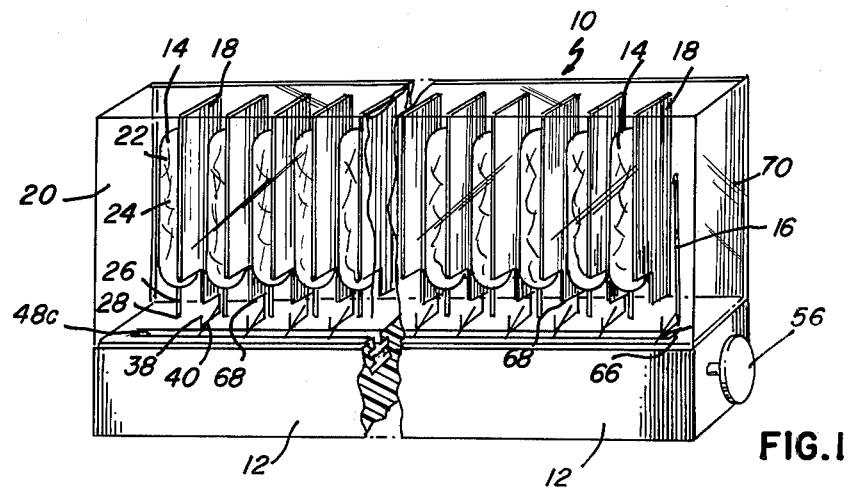
FIG. 1 is a perspective view of the exterior of one embodiment of a signal device using percussive flashlamps in accordance with the invention.

In the specific embodiment illustrated in FIGS. 1-5 and 9, the signal device 10 comprises a support member 12 having a plurality of percussively ignitable flashlamps 14 and a like plurality of respectively associated preenergized striker springs 16 mounted on its upper surface. The flashlamps are arranged in a row so as to form a linear array, and each of the preenergized striker springs is positioned in operative relationship with a respective one of the lamps.

In order to prevent sympathetic ignition of adjacent lamps, the device further includes a plurality of light-shield partitions 18 disposed between respective pairs of the flashlamps. To complete the unit, the assemblage of lamps, striker springs and partitions is enclosed in a transparent cover 20 affixed to the support member 12.

Each of the lamps 14 is substantially identical and comprises an hermetically sealed light-transmitting envelope 22 having a primer depending therefrom and a filling of combustible foil 24 and a combustion supporting gas disposed therein (see FIG. 1). The primer comprises a metal tube 26 within which a wire anvil and a charge of fulminating material are disposed. Each lamp is vertically supported on member 12 by means of a respective bore 28 into which the primer tube 26 is inserted.

Figure 4:
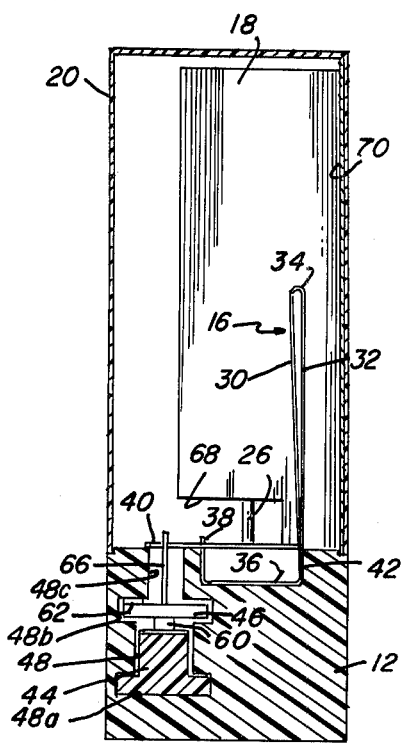
FIG. 4 is an enlarged sectional view on line 4—4 of FIG. 2 which shows one of the striker springs and its position with respect to the selective actuating mechanism.
Figure 9:
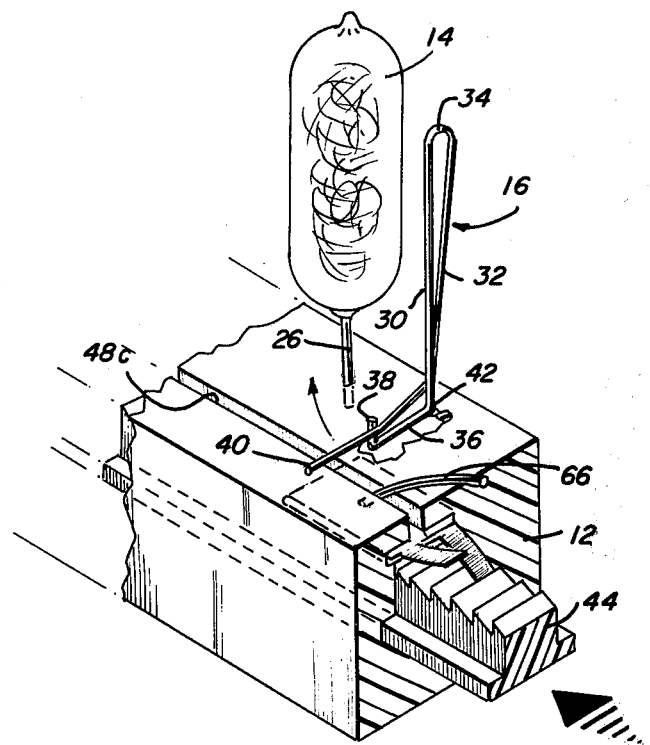

Each of the preenergized striker springs 16 is substantially identical and comprises a folded torsion device typically formed from 0.021 inch music wire about 2.5 inches long. Referring to FIGS. 4 and 9, and the numerically identified elements of spring 16, the wire is shaped to form a hairpin torsional section having segments 30 and 32 joined by a bight 34. The end portion of segment 30 is shaped to define a stationary supporting foot 36, the tip of which is shaped to define a catch 38. The end portion of segment 32 is shaped to define a striker 40, which when the spring is preenergized, or cocked, as shown, crosses over the supporting foot 36 and is retained by catch 38. The stationary supporting foot 36 is seated in an elongated slot formed in the support member 12, the slot being sufficiently shallow so that the catch 38 formed in the free end of foot 36 will project above the upper surface of support member 12.

Initially, the striker 40 may be formed at an angle of about 90° to the stationary support foot 36, although the angle through which the striker is rotated to position it behind catch 38, as shown, may be of any value that does not cause overstressing of the wire. The support member 12 is shaped to provide a suitable bearing surface 42 for the heel of the striker during cocking. This bearing also aids in preventing accidental displacement of the spring sufficiently to free the striker from the catch sometime after cocking and before firing is intended.

Figure 5:
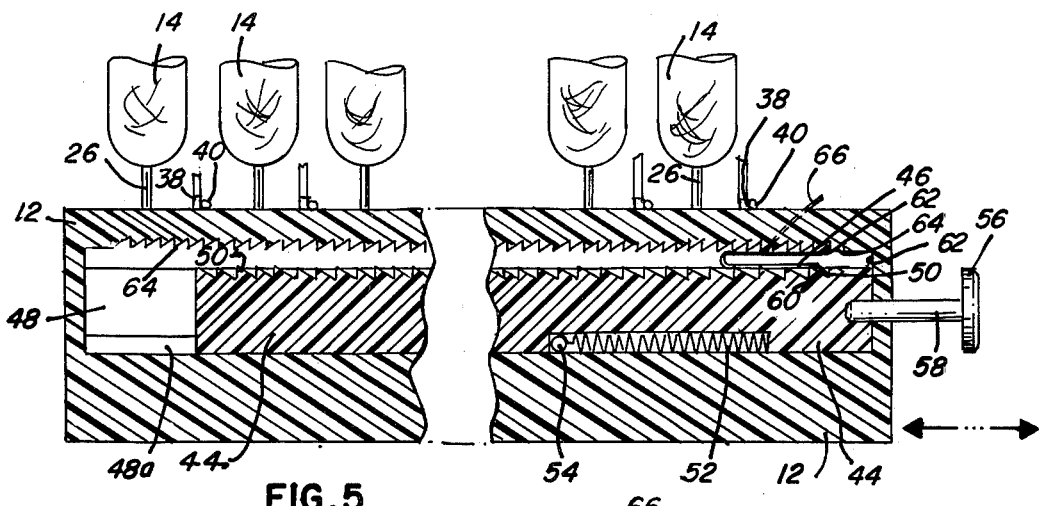
FIG. 5 is an enlarged sectional view on line 5—5 of FIG. 2 which shows the selective actuating mechanism and its position with respect to the row of lamps and strikers (the cover, partitions, and hairpin portion of the springs being omitted for clarity)

Sequential displacement of each cocked striker 40, to release it from the catch 38 and thus permit it to strike the respective primer tube 26 and fire the associated lamp, is effected by a ratchet-action selective actuating mechanism adapted for single-handed operation. Referring to FIGS. 2-5, the selective actuating mechanism comprises a spring loaded ratchet bar 44 and a slidable member 46 which are retained in a longitudinal channel 48 located parallel to the row of flashlamps 14. As shown in FIG. 4, channel 48 has a sectional configuration including a wider horizontal base portion 48a, a second wide horizontal portion 48b, and a narrow upper vertical slot 48c. The ratchet bar 44 is illustrated as having a somewhat inverted T-shaped cross-section, with the wider portion slidably retained in the horizontal base portion 48a of the channel. As best shown in FIG. 5, the top portion of the ratchet bar is provided with a plurality of sawtooth-shaped ratchet teeth 50, and the bar 44 is urged to the right (in FIG. 5) by means of a coiled compression spring 52 held captive in the ratchet bar and secured at the left end by a pin 54 attached to the support member. A push button 56 is disposed on the exterior of the support member and attached to the right end of the ratchet bar 44 by means of a relatively long shaft 58 which passes through a hole provided therefor in an end wall of channel 48. In this manner, button 56 is conveniently accessible for hand actuation.

Figure 3:
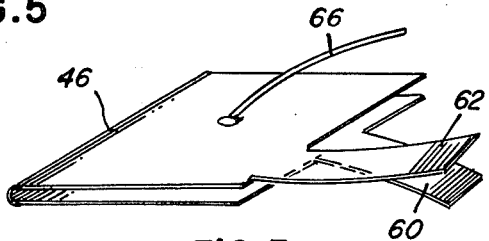
FIG. 3 is an enlarged scale detail view of the slidable member in the selective actuating mechanism for the device of FIG. 1, in accordance with the invention.

Referring particularly to FIGS. 3, 4 and 5, the slidable member 46 comprises a folded flat spring retained in the wider horizontal portion 48b of channel 48 and having a first tang 60 for engaging one of the ratchet teeth 50 of the spring loaded bar 44 and a second tang 62 for engaging an upper surface of the channel portion 48b to prevent the slidable member from sliding to the right (in FIG. 5) and, thus, reversing direction following indexing thereof. This upper surface of channel portion 48b may comprise a smooth, soft plastic material, whereby the tang 62 digs into the soft plastic to prevent sliding in one direction. As illustrated in FIG. 5, however, a more positive engaging action may be assured by providing a plurality of sawtooth-shaped teeth 64 on this upper channel surface.

Attached to the upper surface of the folded flat spring is a trip 66 which projects upwardly at an angle therefrom and passes through the vertical slot portion 48c so as to be adjacent to and in alingment with the row of strikers 40. In summary, therefore, slidable member 46 preferably comprises a folded flat spring retained in channel portion 48b and having first and second tangs projecting from opposite sides thereof for respectively engaging one of the ratchet teeth 50 and one of the channel teeth 64 during appropriate operational states, with trip wire 66 projecting upwardly through slot 48c which is in alignment with all of the strikers.

Each cocked striker 40 of the springs 16 projects beyond the periphery of the channel to overlie slot portion 48c. In particular, the free end of each striker 40 is disposed to lie in the path of travel of the trip wire 66 on slidable member 46. Hence, upon translationally indexing member 46 along channel portion 48b, the striker adjacent to the upcoming trip wire 66 is pushed upwardly by the sloped projection thereof a distance sufficient to clear the top of catch 38. The striker then swings clockwise as viewed from above, and hits and indents the impact sensitive primer tube 26 at a high velocity to cause deflagration of fulminating material located therein and thus ignite the combustible foil 24.

This translational indexing of the folded flat spring 46 is caused by successive hand actuation of the spring located ratchet bar, in plunger fashion, by pushing button 56 against the end of the support member 12. In view of the equal spacing between each of the strikers 40, the button shaft 58 is sufficiently long so that upon each indexing of the button 56, the slidable member 46 will be pushed to the left (in FIG. 5) a sufficient distance to release one of the strikers to fire a lamp and stop short of the next succeeding striker. As previously mentioned, the slidable member 46 is held in position and prevented from reversing direction following indexing by virtue of its tang 62 engaging the upper surface, or teeth 64, of the channel.

Upon indexing the ratchet bar, the slidable member 46 is caused to slide to the left by virtue of the engagement of its tang 60 with one of the ratchet teeth. The sawtooth direction of the channel teeth 64 permits such sliding action of member 46 until the end of travel of the ratchet bar, whereupon during the spring loaded return, tang 62 of member 46 falls into engagement with one of the channel teeth 64 to thereby hold the advanced position of member 46.

The sawtooth direction of the ratchet teeth 50 permits the return sliding action of bar 44 until the end of return travel, whereupon tang 60 of member 46 (at its new position) falls into engageable contact with the ratchet teeth. Thus, the length of button shaft 58 is appropriately related to the spacing between strikers 40, so that each indexing of button 56 causes the slide member to advance to fire a single flashlamp 14. Of course, if the button shaft 58 is made longer, it is possible to design the device to fire two or more lamps in succession during one stroke of button 56.

In the accompanying drawings, each partition 18 is illustrated as being disposed between a respective lamp 14 and the striker spring 16 for firing that lamp. Accordingly, to permit free operation of each striker portion 40 in firing a respective lamp as described above, a clearance notch 68 is provided at the bottom portion of each partition 18. The bottom portion of partition 18 may be secured to support member 12 by being wedged into a slot therein.

In addition to the above-described components, the signal device assembly may further include a sheet of reflecting material 70 along the interior of what may be called the rear side wall of cover 20. The reflecting surface of sheet 70 is inserted so as to face the lamps and function as a reflector of visible light to enhance the signaling affect, as a heat shield with respect to the hand of the user, or as a mirror for daytime signaling purposes. The exterior surface of partitions 18 may also be made reflecting, such as by aluminizing, if desired. In addition to the reflector sheet insert, a filter sheet, such as a cellulose acetate color filter, approximately the same size as the reflector insert may be secured to the opposite inside surface of the cover, i.e., the light transmitting side wall thereof. This color filter, whether blue, yellow, orange, red or other color may serve to draw more attention to the device upon firing, or also function as a decorative feature.

Figure 2:
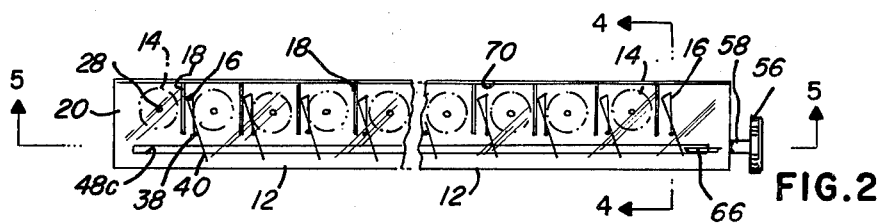
FIG. 2 is a top plane view of the signal device of FIG. 1 with the partitions and several spring members shown in full and the several flashlamps shown in phantom.

Prior to initial operation, the slide member 46 is positioned to one end of the longitudinal slot 48c, as illustrated in FIG. 2, the striker springs are energized (cocked), the lamps and shields are inserted, and the cover 20 is secured, such as by adhesive or heat sealing, to support member 12. To operate the device, a user simply grasps the periphery of the unit enclosure with one hand, faces the lamps in the direction of the intended viewer, and with his index finger pushes button 56 to trip the first striker engaged and fire the respective flashlamp. The resulting flash of light output, which is similar to that employed in photoflash applications, is both attention-getting and readily observable at significant distances, even in daylight. Repeated light flashes may be produced simply by repeated finger indexing of push button 56.

The flashlamps employed in the signal device may be similar to those described in U.S. Pat. No. 3,535,063 and the preenergized striker springs may be similar to those described in U.S. Pat. No. 3,597,604. Cover 20 may be molded of transparent polystyrene, and the reflector sheet 70 may comprise a plastic material that is heavily aluminized on one side (that facing the lamps), and coated on the other side with various decorative colors. Support member 12 and ratchet bar 44 may be molded of a phenolic plastic or fabricated of plexiglass; slider 46 may be formed of metal; and partitions 18 may be formed of metal or plastic.

The above-described device provides a number of significant advantages over existing signal devices. First, and preferably foremost, our device does not require batteries for operation. Secondly, the device is light weight; it is small and can easily fit for example into a shirt pocket, purse, glove compartment, or can be attached to a life vest jacket. Our device is considerably less complicated and safer to use than some other devices, such as pyrotechnic flares. Our device delivers very intense pulses of light which can be seen in both darkness and daylight, as opposed to some devices presently marketed. Another important feature of our invention is its relatively inexpensive construction. Thus, while a xenon flash device may offer the advantages of many more flashes — assuming no dead batteries — we feel that the high cost of xenon safety flash lamps limits their usefulness in terms of the number of people who can afford them.

A particular advantage of the selective actuating mechanism described is that it enables a signaling device to be operated comfortably with one hand; this is, in part, due to the fact that the mechanism is compact and push button operated. Thus, while the simple slider mechanism described in the copending application mentioned hereinbefore is quite functional, it is somewhat awkward to fire single handed. A further advantage of our mechanism is that is can be made water tight with considerably less cost than with other mechanisms. The entire enclosure (cover 20 and support member 12) can be completely sealed, with a sealing gasket provided where the button shaft 58 passes through the support member. Another notable advantage of the mechanism is that it allows one to trigger virtually any number of lamps sequentially without complicating or adding substantially to the mechanism cost. A further advantage is that prefixing the trigger displacement stroke enables firing of any number of lamps almost simultaneously; for example, if lamps are placed ⅜ inch apart, a rapid trigger displacement of 1⅛ inch would fire three lamps in rapid succession.

Figure 6:
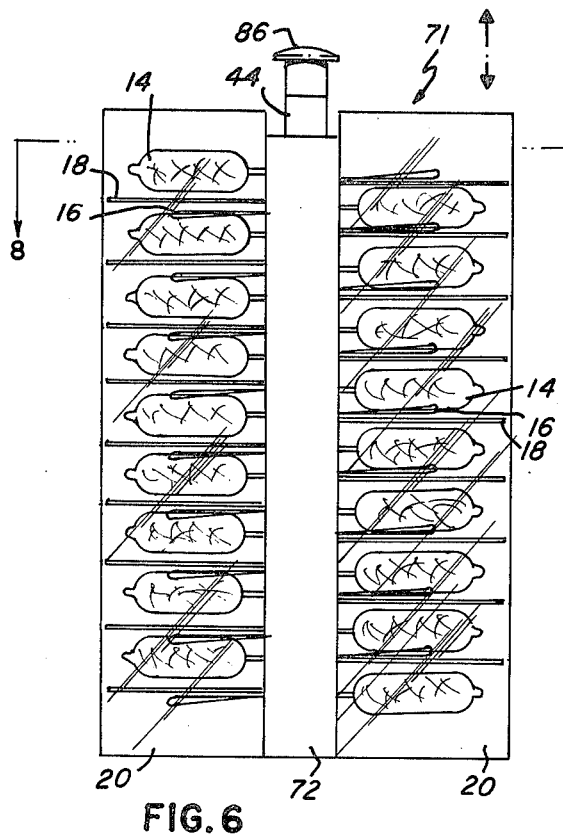
FIG. 6 is a front view of the exterior of an alternative embodiment of a signal device using percussive flashlamps in accordance with the invention.
Figure 8:
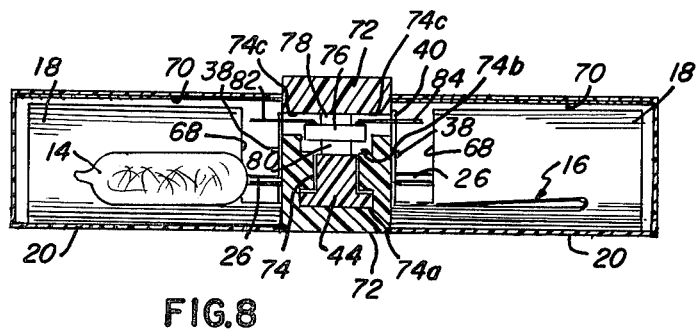
FIG. 8 is an enlarged sectional view on line 8—8 of FIG. 6 which shows the position of the selective atuating mechanism with respect to the two rows of lamps and striker springs and, FIG. 9 is a fragmentary perspective view on an enlarged scale of a single lamp-striker spring assembly of FIG. 1, with a breakaway in the support member to show the full spring and the cover and partition being omitted for clarity.
Figure 7:
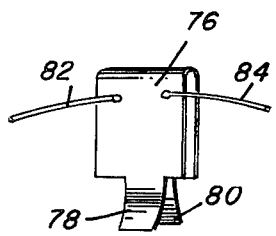
FIG. 7 is an enlarged scale detail view, from the top, of the slidable member in the selective actuating mechanism for the device of FIG. 6.

An alternative embodiment of the invention for essentially providing a planar array 71 of percussively ignitable signal flashlamps is illustrated by FIGS. 6-8. In this arrangement, the flashlamps 14, along with their associated preenergized striker springs 16, are mounted in two parallel rows respectively disposed on opposite sides of a central support member 72. Partitions 18 are disposed between respective pairs of the flashlamps, with each having a clearance notch 68 to permit a free path for each of the released strikers 40 to travel to a respective lamp primer tube 26. A pair of covers 20 are secured to each side of the support member 72 so as to enclose the assembly of lamps, springs and partitions. In this instance, the reflector insert sheets 70 are provided on the cover wall adjacent partition slots 68, and the hairpin portions of the strikers are adjacent the light-transmitting sidewalls of the covers 20.

Support member 72 has a longitudinal channel 74 which is somewhat similar to channel 48 of the previously described embodiment, except that (as viewed in FIG. 8) the top of the channel is covered and the trip wire access slot 74c is horizontal and passes directly through the support member 72, (the slot, at each end of the array, having closed portions for supporting the top wall of central member 72 as viewed in FIG. 8). The spring loaded ratchet bar 44 is essentially the same as that illustrated in FIG. 5 and is retained in channel 74 in the same manner, with the wider portion slidably retained in horizontal base portion 74a of the channel 74. The slider member 76, best shown in FIG. 7, is somewhat similar to the slidable member 46 of FIG. 3 in that it may comprise a folded flat spring with a pair of oppositely projecting tangs 78 and 80. In this instance, however, a pair of sloping trip wires 82 and 84 are provided which respectively project from opposite of the slider member 76 in a somewhat horizontal plane as illustrated in FIG. 8.

As best illustrated in FIG. 8, longitudinal channel 74 is essentially located between the parallel to the two rows of strikers 40 with the strikers of both rows, when in the preenergized or cocked condition, projecting in the same direction beyond the peripheries of channel slot 74c. Slider member 76 is retained in channel portion 74b similarly to the manner in which slidable member 46 is retained in channel portion 48b of FIGS. 4 and 5. That is, tang 80 is in engageable contact with the ratchet teeth of the slidable bar 44 and tang 78 engages the upper surface of the support member channel portion 74c, which may comprise a plurality of sawtooth shaped teeth, as previously discussed with respect to FIG. 5. With this arrangement, trip wires 82 and 84 project through the opposite sides of channel slot 74c so that the paths of travel of the trip wires are respectively aligned with the two rows of striker 40 projections.

In this particular embodiment, a push button 86 is secured directly to the end of the ratchet bar 44, which extends outside the end portion of the central support member 72, as illustrated in FIG. 6.

The row of lamps and strikers on one side of the support member are offset from the row of lamps and strikers on the other side of the central support member, whereby during translation of slider member 76 along channel 74, trip wires 82 and 84 are operative to alternately release strikers on opposite sides of the support member to fire their respective flashlamps.

Operation is similar to that described for the unit of FIGS. 1-5. Downward displacement of trigger button 86 causes an equal displacement of slider 76 via a positive ratchet engagement of one of the ratchet teeth with tang 80. The motion of slider 76 in channel 74 causes the tripping wire 82 or 84 attached to the slider to pick up a preenergized spring and fire the respective lamp. Motion between tang 78 and the upper surface of the channel is unrestricted during the forward stroke of the firing cycle except for a small frictional drag which is easily overcome by the operator depressing the trigger button. The energized compression spring held captive in the ratchet bar (as shown in FIG. 5) causes the return stroke of bar 44 when the operator releases the trigger button. Positive engagement of slider tang 78 and the upper surface of channel 74 via ratchet engagement now prevents the return or backward displacement of the slider during the return stroke. Motion between the slider 76 and ratchet bar 44 is essentially unrestricted in the return stroke except again for a small frictional drag overcome by the energized compression spring. Repeated displacement of trigger button 86 will cause the cycle to repeat until such time as ths slider 76 travels the full length of the channel 74 triggering all lamps in sequence.

Although the invention has been described with respect to specific embodiments, it will be appreciated that modifications and changes may be made by those skilled in the art without departing from the scope of the invention.

What we claim is:

1. A selective actuating mechanism for a signal device intended for hand operation; said signal device including a support member, a plurality of percussively ignitable flashlamps mounted in a row on said support member, and a plurality of preenergized strikers mounted on said support member and releasable to fire said flashlamps; the selective actuating mechanism comprising, in combination:
    a longitudinal channel in said support member located parallel to said row of flashlamps;
    a spring loaded ratchet bar retained in said channel and adapted to be directly actuated by hand;
    a single slidable member retained in said channel in releasable engagement with said ratchet bar; and,
    a single means provided on said slidable member for sequentially releasing all of said preenergized strikers to fire respective ones of said flashlamps in response to successive hand actuation of said ratchet bar and the resulting indexing of the slidable member releasably engaged therewith along said channel.

2. The mechanism of claim 1 wherein said strikers are mounted so that, in the preenergized condition, said strikers project beyond the periphery of said channel, said release means is a projection from said slidable member disposed so that its path of travel is aligned with the projecting portions of said strikers, and said slidable member is operative upon translation along said channel to selectively release said strikers by means of said projection to thereby fire the respectively associated flashlamps.

3. The mechanism of claim 2 wherein said ratchet bar has a plurality of sawtooth-shaped ratchet teeth on a surface thereof, and said slidable member has a first tang for releasably engaging one of said ratchet teeth and a second tang for engaging a surface of said support member channel to thereby prevent said slidable member from reversing direction following indexing thereof.

4. The mechanism of claim 2 wherein said ratchet bar has a plurality of ratchet teeth on a surface thereof, said slidable member has a first protrusion for releasably engaging one of said ratchet teeth, one of the surfaces of the channel in said supporting member is provided with a plurality of teeth, and said slidable member has a second protrusion for engaging one of said channel teeth to thereby prevent said slidable member from reversing direction following indexing thereof.

5. The mechanism of claim 3 wherein said slidable member is a folded flat spring, and said first and second tangs project from opposite sides of said folded flat spring.

6. The mechanism of claim 1 wherein said ratchet bar is spring loaded by means of a coiled compression spring held captive in said ratchet bar and secured at one end by means attached to said support member.

7. The mechanism of claim 1 wherein a push button is attached to one end of said ratchet bar and disposed on the exterior of said support member, whereby said button is accessible for actuation by hand.

8. A signal device intended for hand operation comprising, in combination:
    a support member containing a longitudinal channel;
    a spring loaded ratchet bar retained in said channel and adapted to be directly actuated by hand;
    a single slidable member retained in said channel in releasable engagement with said ratchet bar;
    a plurality of percussively-ignitable flashlamps mounted on said support member;

a plurality of preenergized strikers mounted on said support member and individually releasable to fire a respective one of said flashlamps; and, a single means projecting from said slidable member and adapted for selectively releasing all of said preenergized strikers in succession;

said slidable member being operative upon translation along said channel to sequentially release said strikers by means of said projecting means to thereby fire the respectively associated flashlamps.

9. The signal device of claim 8 wherein a push button is attached to one end of said ratchet bar and disposed on the exterior of said support member, said ratchet bar being operative in response to successive hand actuation thereof by means of said button to cause said slidable member to be indexed along said channel and thereby sequentially release said strikers by means of said projecting means to fire respective ones of said flashlamps.

10. The signal device of claim 8 wherein the preenergized strikers mounted on said base member project beyond the periphery of said channel, and said means projecting from said slidable member comprises a sloping trip wire disposed so that its path of travel is aligned with the projecting portions of said strikers.

11. The signal device of claim 8 wherein each of said flashlamps has a primer tube depending therefrom; said support member contains a plurality of bores each for receiving the primer tube of a respective one of said flashlamps to provide support therefor; and, each of said preenergized strikers is a portion of a folded torsion spring comprising a substantially hairpin torsional section having two segments joined by a bight, said striker portion projecting from one of said segments, a supporting foot projecting from the other of said segments and fixedly mounted on said support member, and a catch formed at the tip of said foot, said striker portion crossing said foot with said catch restraining said striker portion in a cocked condition.

12. The signal device of claim 8 further including a plurality of light-shield partitions disposed between respective pairs of said flashlamps; a cover affixed to said support member and enclosing said flashlamps, strikers and partitions; said cover having at least one transparent sidewall; and a button attached to said ratchet bar and disposed on the exterior of the enclosure formed by said cover and support member, whereby said button is accessible for indexing by hand.

13. The signal device of claim 8 wherein said flashlamps are mounted in two parallel rows on said support member, and said preenergized strikers are mounted in two parallel rows on said support member with said longitudinal channel located between and parallel to said rows of strikers, each row of strikers being associated with a respective row of said flashlamps.

14. The signal device of claim 13 wherein the preenergized strikers mounted on said support member project beyond the peripheries of said channel.

15. The signal device of claim 13 wherein said two rows of flashlamps are mounted on opposite sides of said support member, each row of preenergized striker is mounted on the same side of the support member as its respective row of flashlamps, said two rows of strikers project in the same direction beyond the peripheries of said channel, said longitudinal channel is located between said two rows of striker projections, and said means projecting from said slidable member comprises a pair of sloping trip wires respectively projecting from opposite sides of said slidable member and disposed so that the paths of travel of said trip wires are respectively aligned with said two rows of striker projections.

* * * * *